(12) United States Patent
Schmidt et al.

(10) Patent No.: US 10,286,880 B2
(45) Date of Patent: May 14, 2019

(54) SENSOR CLEANER

(71) Applicant: Ford Global Technologies, LLC, Dearborn, MI (US)

(72) Inventors: David Schmidt, Dearborn, MI (US); Douglas Scott Rhode, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 29 days.

(21) Appl. No.: 15/468,377

(22) Filed: Mar. 24, 2017

(65) Prior Publication Data

US 2018/0272998 A1  Sep. 27, 2018

(51) Int. Cl.
| | |
|---|---|
| *B05B 7/00* | (2006.01) |
| *B08B 3/02* | (2006.01) |
| *B08B 5/02* | (2006.01) |
| *B60S 1/54* | (2006.01) |
| *B60S 1/56* | (2006.01) |
| *B60R 16/08* | (2006.01) |
| *G02B 27/00* | (2006.01) |

(52) U.S. Cl.
CPC ........ *B60S 1/56* (2013.01); *B05B 7/00* (2013.01); *B08B 3/02* (2013.01); *B08B 5/02* (2013.01); *B60R 16/08* (2013.01); *B60S 1/54* (2013.01); *G02B 27/0006* (2013.01)

(58) Field of Classification Search
CPC combination set(s) only.
See application file for complete search history.

(56) References Cited

U.S. PATENT DOCUMENTS

| | | | |
|---|---|---|---|
| 3,447,186 A | 6/1969 | Senkewich | |
| 6,793,416 B2 | 9/2004 | Peterson et al. | |
| 9,420,203 B2 | 8/2016 | Broggi et al. | |
| 2001/0054655 A1* | 12/2001 | Berg | B60S 1/481 239/284.1 |
| 2011/0073142 A1* | 3/2011 | Hattori | B60S 1/0848 134/56 R |
| 2012/0266922 A1 | 10/2012 | Krahn et al. | |
| 2013/0092758 A1 | 4/2013 | Tanaka et al. | |
| 2015/0166021 A1 | 6/2015 | Gokan et al. | |
| 2015/0203077 A1 | 7/2015 | Gokan | |
| 2015/0343999 A1 | 12/2015 | Lopez Galera et al. | |
| 2017/0297536 A1* | 10/2017 | Giraud | B60S 1/56 |

FOREIGN PATENT DOCUMENTS

| | | | | |
|---|---|---|---|---|
| WO | WO 2015120866 A1 | | 8/2015 | |
| WO | WO-2016045828 A1 * | | 3/2016 | B08B 17/02 |

OTHER PUBLICATIONS

GB Search Report dated Sep. 18, 2018 re GB Appl. No. 1804458.6.

* cited by examiner

*Primary Examiner* — Mikhail Kornakov
*Assistant Examiner* — Natasha N Campbell
(74) *Attorney, Agent, or Firm* — Frank A. MacKenzie; Bejin Bieneman PLC

(57) ABSTRACT

A system includes a nozzle directed toward a sensor window and a Venturi valve including a discharger that is connected to the nozzle. The Venturi valve is connected to a fluid input valve and an air source.

19 Claims, 5 Drawing Sheets

SENSOR CLEANER

BACKGROUND

A vehicle may include one or more object detection sensors such as Light Detection and Ranging (LIDAR) sensors to detect objects, e.g., in an area outside the vehicle. A sensor for detecting objects outside a vehicle may be mounted to a vehicle exterior. For example, a sensor may be mounted to a vehicle roof, pillar, etc. A sensor such as a LIDAR sensor is typically subject to environmental conditions, e.g., dirt, dust, etc., that can impair operation of the sensor.

DETAILED DESCRIPTION

Introduction

Figure 1:
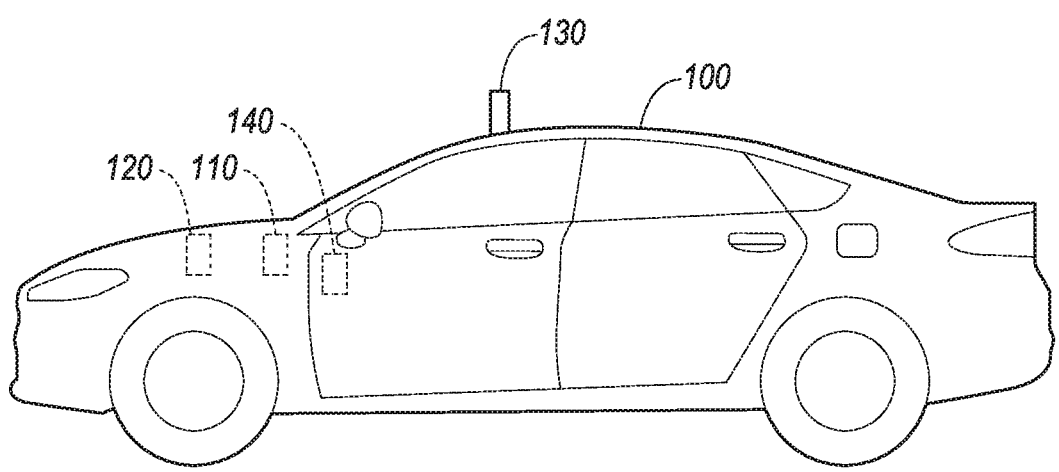
FIG. 1 is a diagram illustrating an example vehicle.

Disclosed herein is a system that includes a nozzle directed toward a sensor window, a Venturi valve including a discharger that is connected to the nozzle. The Venturi valve is connected to a fluid input valve and an air source.

The system may further include a computer that is programmed to, upon determining to clean the sensor window, actuate the fluid input valve to open.

The computer may be further programmed to, upon determining that the sensor window is clean, actuate the fluid input valve to shut off.

The computer may be further programmed to, upon determining to clean the sensor window, first, actuate the air source, and then actuate the fluid input valve to open.

The air source may include a compressor and the computer may be further programmed to actuate the compressor to at least one of turn on and turn off.

The fluid input valve may include a solenoid valve and the computer may be programmed to actuate the solenoid valve to at least one of open and close.

The system may have a plurality of modes of operation including an air only mode and a mixing mode.

The Venturi valve may further include a suction chamber, and an internal nozzle directed to the suction chamber.

The Venturi valve may further include a constriction zone disposed between the suction chamber and the discharger.

The nozzle may be fluidly coupled via a hose to the discharger of the Venturi valve.

The nozzle may be mechanically coupled to the discharger of the Venturi valve.

The system may further include a second nozzle directed toward the sensor window, and a second Venturi valve including a second discharger that is connected to the second nozzle. The second Venturi valve may be connected to a second fluid input valve and the air source.

The system may further include a second nozzle directed toward a second sensor window, wherein the nozzle and the second nozzle are fluidly coupled to the discharge of the Venturi valve.

Further disclosed herein is a method including determining to clean a sensor window, and actuating a fluid input valve to open, wherein a nozzle connected to a discharge of a Venturi valve is directed toward the sensor window and the Venturi valve is connected to the fluid input valve and an air source.

The method may further comprise, upon determining that the sensor window is clean, actuating the fluid input valve to shut off.

The method may further include, upon determining that a wait time has elapsed, actuating the fluid input valve to shut off.

The method may further include, upon determining to clean the sensor window, first, actuating the air source, and then actuating the fluid input valve to open.

Determining to clean the sensor may be based at least in part on data received from a second sensor.

Determining to clean the sensor may be based at least in part on opacity of the sensor window.

The method may further include actuating the fluid input valve to adjusting a flow of fluid to the Venturi valve.

Further disclosed is a computing device programmed to execute any of the above method steps.

Yet further disclosed is a computer program product, comprising a computer readable medium storing instructions executable by a computer processor, to execute any of the above method steps.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as is known. A LIDAR sensor 130 attached to a vehicle 100 exterior, e.g., on a roof 105, pillar, etc., of the vehicle 100, may provide object data by which the computer 110 can make determinations including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data.

The HMI 140 may be configured to receive user input, e.g., during operation of the vehicle 100. For example, a user may select a mode of operation, e.g., an autonomous mode, by inputting a requested mode of operation via the HMI 140. Moreover, the HMI 140 may be configured to present information to the user. Thus, the HMI 140 may be located in a passenger compartment of the vehicle 100. In an example, the computer 110 may output information indicating that a vehicle 100 mode of operation such as an autonomous mode is deactivated due to an event, e.g., a LIDAR sensor 130 sensor blockage that impairs its object detection operation.

Figure 2:
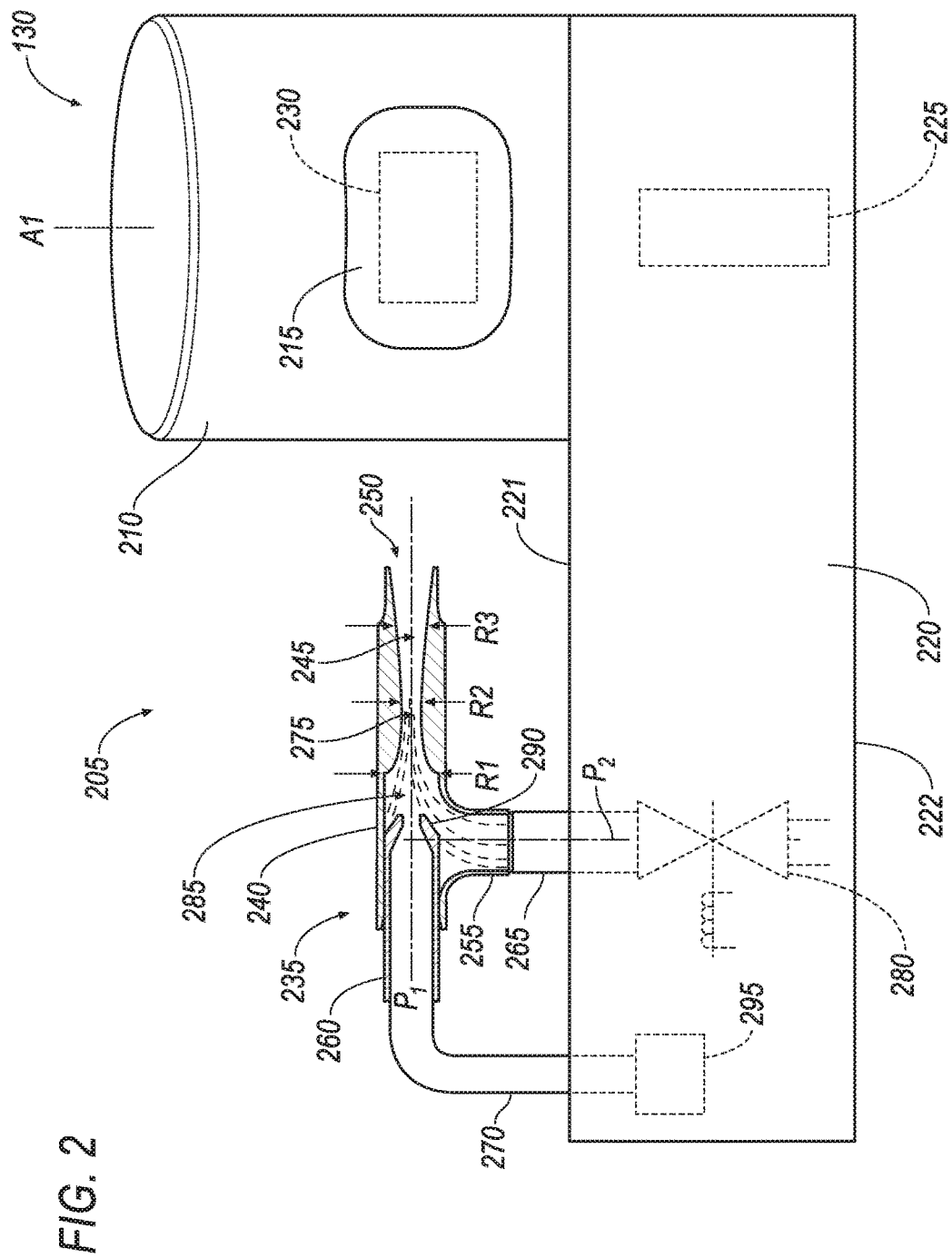
FIG. 2 is a diagram showing a side view of an example sensor assembly of the vehicle of FIG. 1 that includes a Venturi valve directed to a sensor window.

FIGS. 2 shows an example LIDAR sensor 130 including a base 220, an excitation source 230, and a cover 210 having a window 215. The excitation source 230 may transmit an electro-magnetic beam such as a laser beam through the window 215 to an area surrounding the LIDAR sensor 130. The LIDAR sensor 130 may include a receiver that receives reflections of the transmitted electro-magnetic beams. The cover 210 may be formed of plastic, metal, etc. The cover 210 may protect the excitation source and/or other electronic components from environmental influences such as dirt, dust, rain, wind, etc. The window 215 may have a flat, round, etc. shape. The windows 215 may be formed of glass, plastic, etc. The windows 215 may include a lens, e.g., to focus electro-magnetic beams. The base 220 may have a bottom 222 and a top 221. The cover 210 may be mounted to the base 220 top 221.

The LIDAR sensor 130 may include rotation means such as an electric motor 225, to move, e.g., rotate, the excitation source 230 relative to the base 220. In an example, the motor 225 may rotate the excitation source 230 about an axis Al perpendicular to the base 220 top 221, and may provide a 360-degree horizontal field of view of an area around the LIDAR sensor 130. In one example, the excitation source 230, the cover 210, and the window 215 may rotate about the axis Al. Alternatively, a non-rotating LIDAR sensor 130 lacks a rotation means, i.e., the cover 210, the window 215, and the excitation source 230 may be fixed relative to the base 220. Additionally or alternatively, the sensor 130 may be a radar, a camera, an infrared sensor, etc.

In order to provide data, a window 215 of a LIDAR sensor 130 may allow the transmitted electro-magnetic beams and received reflections of the transmitted radiations to pass through the window 215. Various conditions may cause a window 215 blockage, e.g., attenuating (weakening) the transmitted radiations and/or reflections thereof when passing through the window 215. For example, an object detection operation of a LIDAR sensor 130 may be impaired upon a blockage of the LIDAR sensor 130 window 215. In one example, dirt, dust, etc., on an exterior surface of the LIDAR sensor 130 window 215 can cause a blockage of the LIDAR sensor 130. For example, the computer 110 may be programmed to activate a non-autonomous mode of the vehicle 100 upon determining that a LIDAR sensor 130 cannot provide object data, e.g., due to a blockage of the LIDAR sensor 130.

As shown in FIG. 2, the vehicle 100 may include a sensor cleaner 205 that includes a nozzle 250 directed toward a sensor 130 window 215, a Venturi valve 240 including a discharger 245 that is connected to the nozzle 250. The Venturi valve 240 is connected to a fluid input valve 280 and an air source 295. Thus, advantageously, a stream of air and/or fluid outputted from the Venturi valve 240 discharger 245 may clean the sensor 130 window 215 from, e.g., dust, dirt, etc.

A Venturi valve 235 (sometimes referred to as an aspirator valve, ejector jet pump, and/or eductor) in the context of present disclosure is a valve that obtains energy stored in a moving motive fluid, e.g., air, to pump and/or mix a second fluid, e.g., washing fluid, through a suction input 255. A flow of the motive fluid though a constriction zone 275 (as discussed below) of the Venturi valve 235 may result in a Venturi effect such as is known that can pull in the second fluid and/or gas to through the suction input 255. These two fluid streams are then mixed and streamed out through the discharger 245.

The Venturi valve 235 may include a suction chamber 285 disposed inside the valve 235, and a constriction zone 275 (or choke) disposed between the suction chamber 285 and the discharger 245. The motive fluid and/or gas enters the suction chamber 285, e.g., via an internal nozzle 290, and may flow through the suction chamber 285 and the constriction zone 275 to the discharger 245. In one example, the suction chamber 285 and/or the constriction zone 275 may have a circular cross section. A suction chamber 285 may have a diameter $R_1$ that is greater than a diameter $R_2$ of constriction zone 275. Such decrease in diameter while the fluid and/or gas moves through the valve 235 results in a pressure drop inside the suction chamber 285. Thus, the Venturi effect results in a pressure inside the suction chamber 285 that is lower relative to a pressure at the suction input 255. Such pressure difference between the suction chamber 285 and the suction input 255 can result in pulling in (i.e., suctioning) a second fluid, e.g., a wash fluid, through the suction input 255 and mixing it with the motive flow of the first fluid, e.g., air, that is streamed through the valve 235 (i.e., from an input opening 260 for the motive fluid to the discharger 245).

In one example, the Venturi valve 235 may have a T shape. The motive fluid may stream through a substantially straight path $P_1$ from the input 260 to the discharger 245. The internal nozzle 290 may be directed to the constriction zone 275, i.e., the motive fluid and/or gas may stream from the input 260, via the internal nozzle 290, the suction chamber 285, and the constriction zone 275 to the discharger 245. The wash fluid may move through a path $P_2$ that is transverse, e.g., perpendicular, to the path $P_1$.

The Venturi valve 235 discharger 245 may be coupled to a nozzle 250. The discharger 245 is typically what is referred to as a diffuser, i.e., the discharger 245 spreads the fluid mixture by reducing a speed of the flow through an expansion of a flow passage. Therefore, a diameter $R_3$ of the discharger 245 is typically greater than the diameter $R_2$ of the constriction zone 275. An increase of diameter (from $R_2$ to $R_3$) expands the passage for the flow and reduces the speed of the flow. After this, the nozzle 250 sprays the mixture and/or air to the sensor 130 window 215. In one example, the valve 235 discharger 245 may be threaded and the nozzle 250 may be screwed to the discharger 245 threads. In another example, the valve 235 and the nozzle 250 may be made as one piece, e.g., injection molded together. In another example shown in FIG. 3, the nozzle 250 may be fluidly coupled, e.g., via a hose 310, to the valve 235 discharger 245. The nozzle 250 may spray the mixture and/or air in various shapes, e.g., a thin film, a solid cone shape, etc. A suitable nozzle 250 for the sensor 130 window 215 may be selected based on an expected shape of the sprayed mixture. An expected shape of the mixture may be selected based on various inputs including a size of an area of the window 215 that should be sprayed on, expected impact force resulted by sprayed mixture hitting the window 215, etc.

Figure 3:
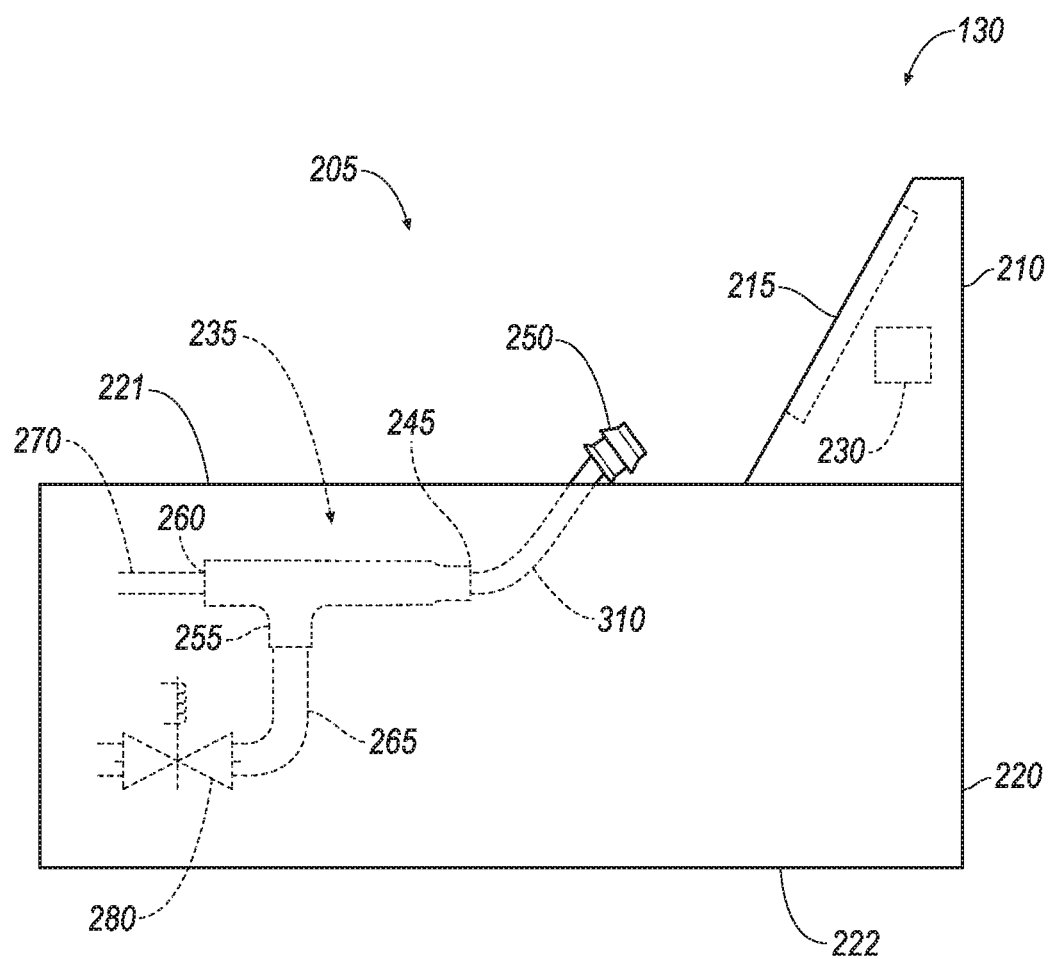
FIG. 3 is a diagram showing another example sensor assembly of the vehicle of FIG. 1 with a Venturi valve recessed inside a base.

As shown in FIG. 2, the Venturi valve 235 may be mounted to the base 220 top 221 while being directed to the sensor 130 window 215. As another example shown in FIG. 3, the Venturi valve 235 may be recessed in the base 220 or any other location in the vehicle 100 and fluidly coupled via a hose 310 to a nozzle 250 that is directed to the sensor 130 window 215. In other words, the nozzle 250 is directed to the sensor 130 window 215, although the Venturi valve 235 discharger 245 may be installed in any direction. In one example, the nozzle 250 may be mounted to the base 220 top 221, and protrudes outwardly through the top 221 surface. As shown in FIG. 3, the sensor 130 may be fixed (non-rotating) and an axis of the nozzle 250 may be transverse to the window 215 surface.

The input 260 of the Venturi valve 235 may be fluidly coupled to the air source 295 via a hose 270. The air source 295 may include an electrical air compressor, a compressed air capsule, etc. The vehicle 100 computer 110 may be programmed to actuate the air source to turn on and/or off. Additionally or alternatively, the computer 110 may be programmed to adjust a flow of air flowing through the hose 270, e.g., via an adjustable flow control valve. In another example, the computer 110 may be programmed to adjust the air pressure generated by a compressor. The air source 295 may be disposed at any suitable location in or on the vehicle 100 and coupled to the valve 235 via the hose 270 or any other type fluid coupling.

The cleaner 205 (or the vehicle 100) may include a fluid reservoir, e.g., a washing fluid container, that is fluidly coupled, e.g., via a hose 265 to the valve 235. The cleaner 205 may include a fluid control and the fluid input valve 280 that controls a flow of, e.g., washer fluid, through the hose 265. The fluid input valve 280 may include an electrical solenoid valve that can be actuated by the vehicle 100 computer 110 to turn on and/or off. Additionally or alternatively, the fluid input valve 280 may include a flow control valve that can adjust a flow of the fluid through the hose 265. Additionally or alternatively, the fluid input valve 280 may include a check valve that prevents a flow of the motive fluid via the hose 265 to the fluid reservoir. In other words, the check valve may allow a flow of washer fluid from the fluid reservoir to the Venturi valve 235 but prevents a flow from the Venturi valve 235 to the fluid reservoir.

As stated above, a sensor 130 window 215 may be blocked due to dirt, dust, etc. and thus lack an ability to, e.g., detect objects in the sensor 130 field of view. The computer 110 may be programmed to actuate the fluid input valve 280 to open upon determining to clean the sensor 130 window 215. For example, the computer 110 may be programmed to detect whether the sensor 130 lacks an ability to detect an object based on comparing data received from a second vehicle 100 sensor 130. In one example, the computer 110 may determine to clean the sensor 130 window 215 upon determining that a radar sensor 130 detects an object in the field of view of the sensor 130 while the sensor 130 does not detect the object. In another example, the computer 110 may be programmed to measure an opacity of the sensor 130 window 215 and determine to clean the window 215 upon determining that the window 215 opacity exceeds an opacity threshold.

Opacity is a measure of the degree to which electromagnetic radiation such as the radiation emitted by the sensor 130 penetrates the window 215. An opacity may have a numerical quantity between 0% (zero) and 100%. Zero percent opacity may be associated with a transparent material, whereas 100% opacity may be associated with, e.g., a blocked window 215, that prevents a radiation from passing through the given medium. An increased opacity of the window 215, e.g., because of dust, dirt, etc., may impair sensor 130 operation. For example, a window 215 covered with dirt may impair or prevent an ability of the sensor 130 to detect objects. In one example, the computer 110 may be programmed to determine the opacity of the window 215 based on radiation received via the LIDAR sensor 130 electro-magnetic receiver. For example, the computer 110 may determine that the window 215 is blocked, e.g., when the window 215 opacity exceeds a predetermined threshold, e.g., 30%. In another example, the computer 110 may be programmed to determine that the window 215 is blocked upon determining that the window 215 opacity has been greater than the predetermined threshold for at least a predetermine minimum time duration, e.g., 5 seconds.

The computer 110 may be programmed to actuate the fluid input valve 280 to shut off upon determining that the sensor 130 window 215 is clean, e.g., when the sensor 130 resumes detection of objects in the field of view of the sensor 130 based on comparing the data received from the sensor 130 and a second sensor 130 such a radar sensor 130. In another example, the computer 110 may be programmed to actuate the fluid input valve 280 to shut off after a predetermine time, e.g., 5 seconds, elapsed since the activation of the fluid input valve 280.

The Venturi valve 235 may have multiple modes of operation. For example, the Venturi valve 235 may have an "air only" mode, a "mixing" mode, and a "deactivated" mode. The computer 110 may be programmed to change the mode of operation of the Venturi valve 235. In one example, the computer 110 may be programmed to output information including a current mode of operation of the Venturi valve 235 to the vehicle 100 HMI 140.

In the "deactivated" mode, a flow of air through the motive input 260 may be stopped, e.g., the computer 110 may be programmed to turn off the air source 295 such as the compressor. For example, the computer 110 may be programmed to put the Venturi valve 235 in the "deactivated" mode, upon determining that the sensor 130 window 215 is clean.

In the "mixing" mode, the computer 110 may be programmed to actuate the air source 295 to provide an air flow to the motive input 260 and actuate the fluid input valve 280 to open. In the "mixing" mode, a mix of air and washing fluid may outputted from the Venturi valve 235. A mixture of air and washing fluid may clean the window 215. Additionally, the computer 110 may be programmed to adjust a ratio of washing fluid to air in the "mixing" mode by adjusting a flow of the fluid to the suction input 255. For example, the fluid input valve 280 may include a flow control valve and the computer 110 may be programmed to actuate the flow control valve to partially open to 50% (e.g., 50% of a diaphragm inside the valve will be opened to allow the fluid to pass through). In one example, the computer 110 may be programmed to adjust the opening based on an amount of dust, dirt, etc. on the window 215. For example, the computer 110 may be programmed to increase the opening of the flow control valve based on an opacity of the window 215. The computer 110 may be programmed to open the valve 235 at 50% when the window 215 opacity is determined to be less than 70% and open the valve fully (i.e., 100%) upon determining that the window 215 opacity exceeds 70%.

In the "air only" mode, the computer 110 may be programmed to actuate the air source 295 to provide an input air flow to the input 260, and actuate the fluid input valve 280 to close. For example, the computer 110 may be programmed to operate the Venturi valve 235 in the "air only" mode, upon ending the "mixing" mode. For example, the computer 110 may be programmed to operate the Venturi valve 235 in the "air only" mode, upon determining that the predetermined time for operating the valve 235 in the "mixing" mode elapsed. In one example, upon determining to clean the window 215, the computer 110 may be programmed to operate the valve 235 for 5 seconds in the "mixing" mode, and then operate the valve 235 in the "air only" mode. Thus, advantageously, any droplets of washing fluid on the window 215 resulted from the "mixing "mode operation of the valve 235, may dry out. In addition, the computer 110 may be programmed to actuate the air source 295 to turn off upon determining that a predetermined "air only" time, e.g., 10 seconds, elapsed.

Upon determining to clean the sensor 130 window 215, the computer 110 may be programmed to actuate the air source 295, and then actuate the fluid input valve 280 to open. For example, upon determining to clean the window 215, the computer 110 may be programmed to operate the valve 235 in a sequence of "air only" mode, "mixing" mode, "air only" mode, and finally "deactivated" mode. Each of the transitions between the modes may be based on predetermined time and/or information, e.g., the window 215 opacity, from vehicle 100 sensors 130.

Figure 4:
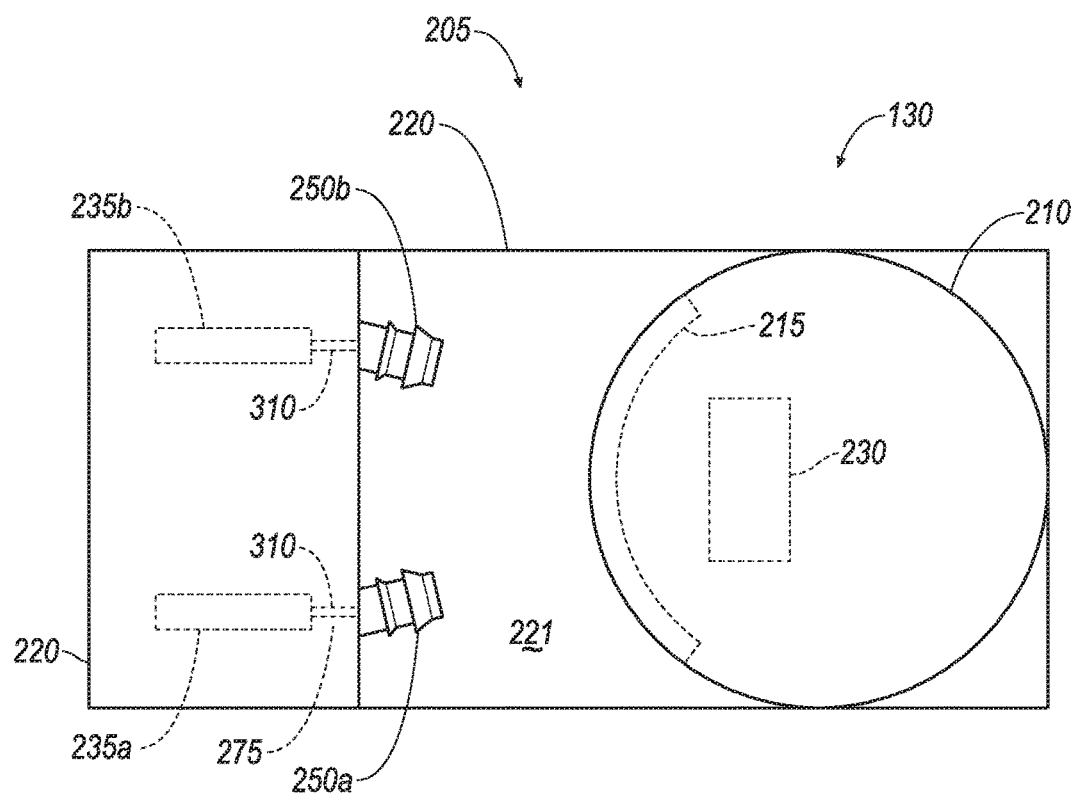
FIG. 4 is a diagram showing a top view of an example sensor assembly with two Venturi valves and nozzles directed to different sides of a sensor window.

In one example, the cleaner 205 may include multiple Venturi valves 235a, 235b directed to different portions of a window 215. For example, as shown in FIG. 4, the nozzles 250a, 250b may be directed to different sections of a semi-cylindrical window 215. In this example, the cover 210 and the excitation source 230 may be fixed relative to the base 220 and each of the nozzles 250a, 250b may be directed to a portion of the semi-cylindrical window 215. In one example, the portions covered by the air and/or mixture sprayed by the valves 235a, 235b may overlap. As shown in FIG. 4, each of the nozzles 250a, 250b may be supplied by a dedicated Venturi valve 235a, 235b.

In another example (not shown in Figures), a Venturi valve 235 may be fluidly coupled, e.g., via a three-way connector, to the nozzles 250a, 250b. In yet another example, one Venturi valve 235 may be fluidly coupled to multiple nozzles 250. For example, a Venturi valve 235 discharger 245 may be fluidly coupled to a first nozzle 250 directed to a first sensor 130 window 15 and a second nozzle 250 directed to a second sensor 130 window 215.

Processing

Figure 5:
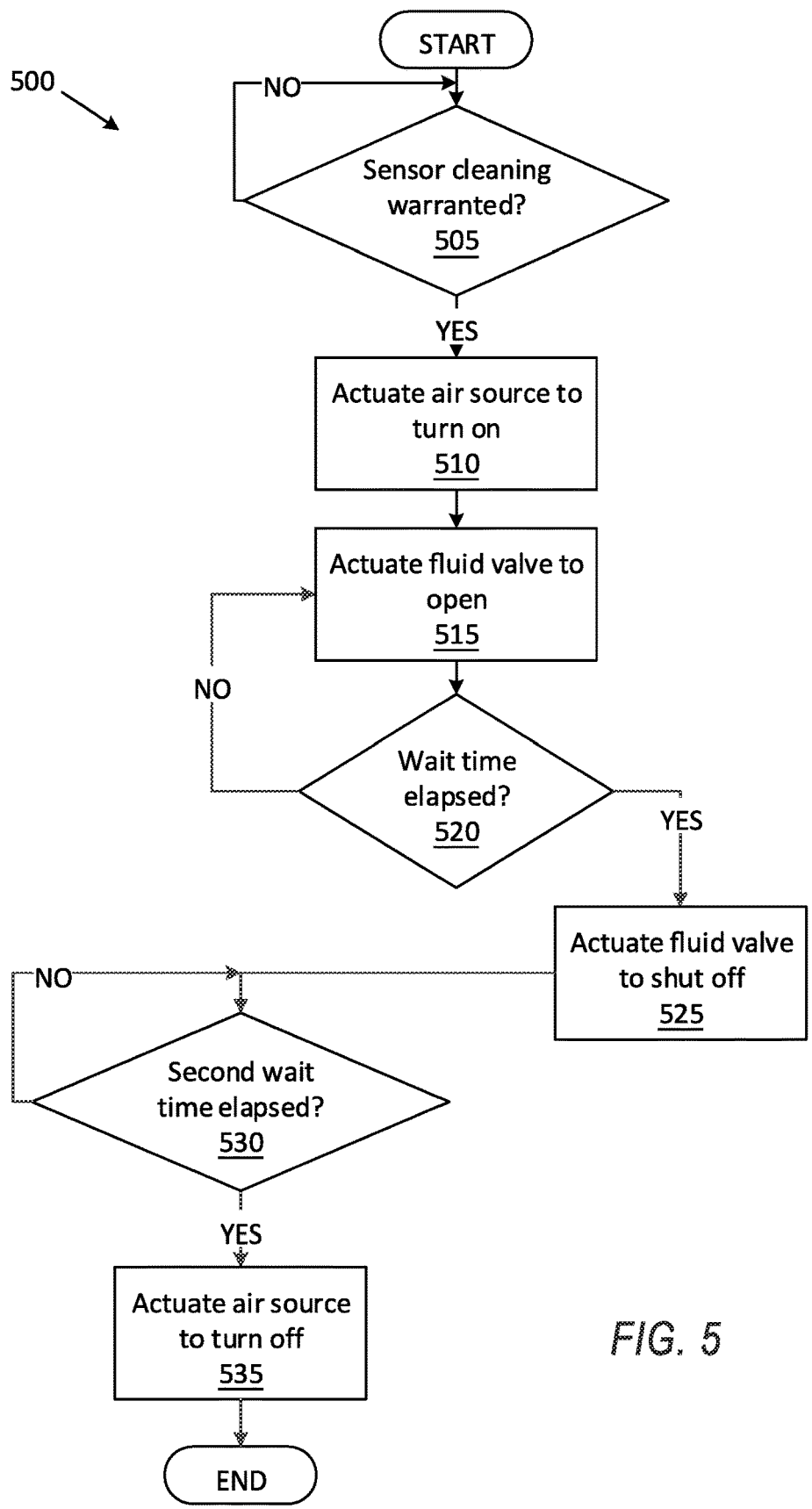
FIGS. 5 is a flowchart of an exemplary process for operating the sensor cleaner.

FIGS. 5 is flowchart of an example process 500 for operating a sensor 130 cleaner 205. For example, the vehicle 100 computer 110 may be programmed to execute blocks of the process 500.

The process 500 begins in a decision block 505, in which the computer 110 determines whether a sensor 130 window 215 cleaning is warranted. For example, the computer 110 may be programmed to determine that the sensor 130 window 215 cleaning is warranted based on data, e.g., the window 215 opacity, received from vehicle 100 sensors 130. For example, the computer 110 may be programmed to determine that the sensor 130 window 215 cleaning is warranted upon determining that the window 215 opacity exceeds a predetermined threshold, e.g., 50%. If the computer 110 determines that the sensor 130 window 215 cleaning is warranted, then the process 500 proceeds to a block 510; otherwise the process 500 returns to the decision block 505.

In the block 510, the computer 110 activates the air source 295. For example, the computer 110 may be programmed to actuate an air compressor to turn on (i.e., "air only" mode of operation.)

Next, in a block 515, the computer 110 actuates the fluid input valve 280 to open. For example, the computer 110 may be programmed to actuate the valve 280 to fully open (i.e., "mixing" mode of operation.)

Next, in a decision block 520, the computer 110 determines whether a wait time for "mixing' mode has elapsed. For example, the computer 110 may be programmed to determine that the wait time has elapsed upon determining that a predetermined time such as 5 seconds has elapsed since actuation of the fluid input valve 280. Additionally or alternatively, the computer 110 may be programmed to determine that the wait time has elapsed based on information, e.g., the window 215 opacity, received from the vehicle 100 sensors 130. If the computer 110 determines that the wait time for the "mixing" mode has elapsed, then the process 500 proceeds to a block 525; otherwise the process 500 returns to the decision block 520.

In the block 525, the computer 110 actuates the fluid input valve 280 to shut off. Thus, the computer 110 changes the mode of operation from the "mixing" mode to the "air only" mode.

Next, in a decision block 530, the computer 110 determines whether a second wait time for "air only" mode has elapsed. For example, the computer 110 may be programmed to determine that the wait time for the "air only" mode has elapsed upon determining that a predetermined time such as 10 seconds has elapsed since actuation of the fluid input valve 280 to turn off. Additionally or alternatively, the computer 110 may be programmed to determine that the wait time has elapsed based on information, e.g., the window 215 opacity, received from the vehicle 100 sensors 130. If the computer 110 determines that the second wait time has elapsed, then the process 500 proceeds to a block 535; otherwise the process 500 returns to the decision block 530.

In the block 535, the computer 110 actuates the air source 295 to turn off. Thus, by turning the air source 295 off, the Venturi valve 235 mode of operation changes to the "deactivated" mode.

Following the block 535, the process 500 ends, or alternatively, returns to the decision block 505, although not shown in FIG. 5.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
   a nozzle directed toward a sensor window; and
   a Venturi valve including a suction chamber, an internal nozzle directed to the suction chamber, and a discharger that is connected to the nozzle, wherein the Venturi valve is connected to a fluid input valve and an air source.

2. The system of claim 1, further comprising a computer that is programmed to, upon determining to clean the sensor window, actuate the fluid input valve to open.

3. The system of claim 2, wherein the computer is further programmed to, upon determining that the sensor window is clean, actuate the fluid input valve to shut off.

4. The system of claim 2, wherein the computer is further programmed to, upon determining to clean the sensor window, first, actuate the air source, and then actuate the fluid input valve to open.

5. The system of claim 2, wherein the air source includes a compressor and the computer is further programmed to actuate the compressor to at least one of turn on and turn off.

6. The system of claim 2, wherein the fluid input valve includes a solenoid valve and the computer is programmed to actuate the solenoid valve to at least one of open and close.

7. The system of claim 1, wherein the system has a plurality of modes of operation including an air only mode and a mixing mode.

8. The system of claim 1, wherein the Venturi valve further includes a constriction zone disposed between the suction chamber and the discharge.

9. The system of claim 1, wherein the nozzle is fluidly coupled via a hose to the discharger of the Venturi valve.

10. The system of claim 1, wherein the nozzle is mechanically coupled to the discharger of the Venturi valve.

11. The system of claim 1, further comprising:
    a second nozzle directed toward the sensor window; and
    a second Venturi valve including a second discharger that is connected to the second nozzle, the second Venturi valve connected to a second fluid input valve and the air source.

12. The system of claim 1, further comprising a second nozzle directed toward a second sensor window, wherein the nozzle and the second nozzle are fluidly coupled to the discharger of the Venturi valve.

13. A method, comprising:
    determining to clean a sensor window; and actuating a fluid input valve to open, wherein a nozzle connected to a discharger of a Venturi valve is directed toward the sensor window and the Venturi valve is connected to the fluid input valve and an air source, wherein the Venturi valve includes a suction chamber, an internal nozzle directed to the suction chamber.

14. The method of claim 13, further comprising, upon determining that the sensor window is clean, actuating the fluid input valve to shut off.

15. The method of claim 13, further comprising, upon determining that a wait time has elapsed, actuating the fluid input valve to shut off.

16. The method of claim 13, further comprising, upon determining to clean the sensor window, first, actuating the air source, and then actuating the fluid input valve to open.

17. The method of claim 16, wherein determining to clean the sensor is based at least in part on data received from a second sensor.

18. The method of claim 16, wherein determining to clean the sensor is based at least in part on opacity of the sensor window.

19. The method of claim 18, further comprising actuating the fluid input valve to adjust a flow of fluid to the Venturi valve.

* * * * *